United States Patent [19]

Brent

[11] 4,319,170
[45] Mar. 9, 1982

[54] MOTOR CONTROL METHOD AND SYSTEM

[76] Inventor: Allan L. Brent, c/o Dynamic Systems Design, 145 Palisade St., Dobbs Ferry, N.Y. 10522

[21] Appl. No.: 141,766

[22] Filed: Apr. 21, 1980

[51] Int. Cl.³ .......................... H02P 3/14; H02K 23/66
[52] U.S. Cl. .................................... 318/376; 318/258; 318/293; 318/302
[58] Field of Search .............. 318/362, 375, 376, 255, 318/256, 257, 258, 261, 280, 291, 293, 300, 302

[56] References Cited

U.S. PATENT DOCUMENTS

| | | | |
|---|---|---|---|
| 3,032,697 | 5/1962 | Kirk | 318/293 |
| 3,143,695 | 8/1964 | Hohne, Jr. et al. | 318/257 |
| 3,378,699 | 4/1968 | Bruinsma et al. | 318/293 X |
| 3,471,103 | 10/1969 | Gabor | 318/293 X |
| 3,566,227 | 2/1971 | Edhlund | 318/258 |
| 3,568,024 | 3/1971 | Robbins | 318/280 X |
| 3,611,092 | 10/1971 | Wilmunder | 318/293 X |
| 3,781,617 | 12/1973 | Thomas | 318/261 |

OTHER PUBLICATIONS

Graf, Rudolf F., *Modern Dictionary of Electronics*, H. W. Sam Co., Inc., Indianapolis, Ind., 1978, p. 171.

*Primary Examiner*—Gene Z. Rubinson
*Assistant Examiner*—Richard M. Moose
*Attorney, Agent, or Firm*—Karl F. Ross

[57] ABSTRACT

A direct-current motor is energized through a diode in the emitter-base network of a transistor and through the emitter-collector network of another transistor which is held conductive by the driving current but which automatically limits the current flow through the motor. When the circuit is de-energized, a self-braking effect is established by the circuit which is substantially symmetrical for reversing operation of the motor.

2 Claims, 2 Drawing Figures

MOTOR CONTROL METHOD AND SYSTEM

FIELD OF THE INVENTION

My present invention relates to a motor-control system and, more particularly, to a system for the control of a direct-current motor, e.g. for driving a pump, syringe or other device in a laboratory, diagnostic or other instrument, or for low-power motors to drive drapes, window blinds and the like, toys, etc.

BACKGROUND OF THE INVENTION

Various control systems have been provided heretofore for the operation of direct-current motors and some of these circuits can include elements intended for automatic braking of rotation of the motor upon de-energization. Such systems can be used for practically any motor-control purposes and generally comprise a thyristor, controlled rectifier or other circuit element which is switched between a blocking and an unblocking state by transistors, diode networks or the like.

Many of these systems are relatively complicated and cannot effectively be used for current-limiting operations without additional circuit elements.

OBJECTS OF THE INVENTION

It is an object of the present invention to provide an improved DC motor-control circuit whereby the above-mentioned disadvantages are obviated.

It is also an object of the invention to provide a DC motor-control system which has a minimum number of circuit elements and is particularly suitable for use in the self-braking reversible control of direct-current motors in laboratory, experimental, diagnostic, analytical and other instruments as well as for low-power applications, e.g. in the drive of window blinds, shades, drapes and the like.

It is another object of this invention to provide an improved method of controlling a direct-current motor.

SUMMARY OF THE INVENTION

These objects and others which will become apparent hereinafter are attained, in accordance with the present invention, in a direct-current motor-control system which can be used, for example, in a compact diagnostic instrument for driving a suction or vacuum pump. For example, the motor has application in ophthalmological instruments of the type in which a cup is applied to the eye and suction is induced in the cup to measure interocular blood pressure, ophthalmological artery pressure and like parameters. The motor-control system also has application in low-power devices where self-braking is important, e.g. in the control of drapes, window blinds and the like.

More particularly, the direct-current motor is connected in a circuit which includes switching means between one terminal of a direct-current source and a diode for energizing the motor to drive the same in one direction, the diode being bridged between the base and one of the power elements (collector or emitter) of a transistor, the base being biased by connection through a resistor to the other terminal of the source such that the transistor is essentially nonconductive between its collector and emitter. The other side of the motor is returned to the other terminal of the source through the power electrodes (emitter-collector network) of another transistor whose base may also be connected by a resistor to the source so that the operation of the switch means provides a shift in the relative potentials on the transistor terminals so as to render the same conductive.

According to a feature of the invention, the circuit is essentially symmetrical so that corresponding transistors are provided on each side of the motor with respective diodes connected across a base power electrode network and the power electrodes (emitter-collector network) are connected in series between the other terminal of the source and the junction between the diode and the motor.

When reverse operation of the motor is desired, a corresponding switch means can be provided between the first-mentioned terminal of the source and the other diode.

Advantageously the transistor is a PNP transistor with the diode between the base and the emitter of the respective transistor and the positive potential applied from the source through the switch means to the junction between the diode and the base. The base is connected to the negative terminal of the source through a biased resistor and the collector of each transistor is likewise connected to the negative terminal of the source.

The circuit, especially if it is symmetrical as described, requires that the forward voltage drop of the diode through which the motor is energized be sufficient to maintain its transistor in a nonconductive state while the other transistor is rendered conductive by the increase in the potential in its emitter, the base being held at the biasing potential through its resistor. As a consequence, the driving current path is through the diode of the blocking transistor. When the switch means open circuits, the driving potential or head of the first diode is cut off, the transistor associated therewith partially is rendered conductive and functions as a load and dynamic braking is achieved.

According to another feature of this invention, each of the transistors may be replaced by or augmented by a pair of Darlington transistors to increase the current which can be carried and/or the switch means can be either a manually operable switch or an electronic switch which can be programmed for operation at any particular moment. For speed control of the motor, the source or the switch means may be pulsed at a variable frequency.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
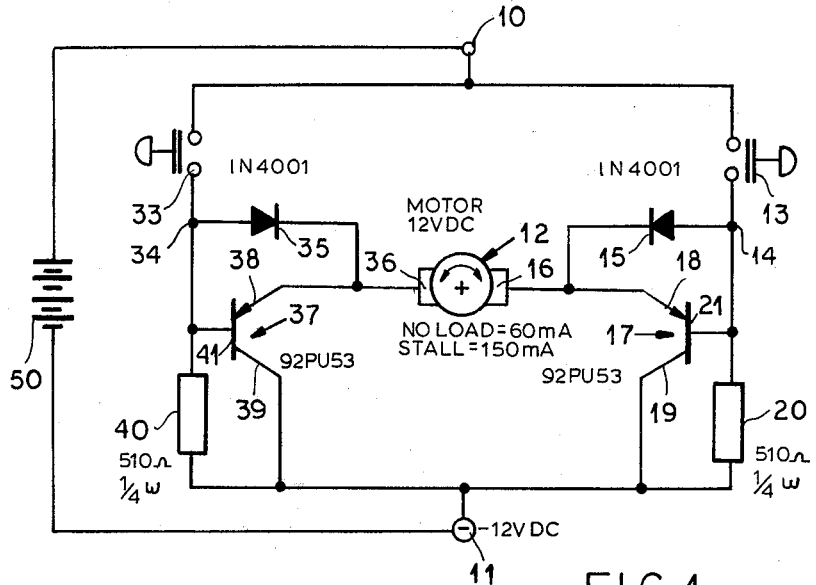
FIG. 1 is a circuit diagram of a simple version of the motor control circuit of the present invention.

In FIG. 1 the positive and negative terminals have been represented at 10 and 11 and correspond to the terminals of a direct-current source such as a battery 50 or a rectifier circuit supplied by the power lines. The motor 12 can be any direct-current motor and can be connected to practically any load, e.g. a suction pump of an ophthalmological instrument as described in my copending application Ser. No. 072,624, filed Sept. 5, 1979, now U.S. Pat. No. 4,281,662, issued on Aug. 4, 1981.

According to the invention, the direct-current source terminal 10 is connected through a switch means 13 or 33 to the junction 14 or 34 of a diode 15 or 35. The diodes 15 and 35 are poled to supply current to the respective terminals 16 and 36 of the motor 12.

In a symmetrical configuration as shown, the PNP transistors 17 and 37 have their emitters 18 and 38 tied between the diode 15 or 35 and the opposite sides of the motor 12.

The collectors of the transistors 17 and 37 are shown at 19 and 39 to be connected to the negative terminal 11 of the direct-current source. Biasing resistors 20 and 40 are connected between the negative terminal 11 and the respective base 21, 41 of the transistors 17 and 37. The diodes 15 have a forward voltage drop of a fraction of the volt, (say 0.7 volt) when traversed by current in the forward direction.

When the switch 13, for example, is closed and switch 33 is open, the current path is from the positive terminal 10 through the diode 15 to the motor 12. There is some voltage drop across the diode 15 and the base 21 is biased into a nonconductive state, the current path continues through the emitter 38 and collector 39 of the transistor 37 which is rendered conductive. The motor is thus driven in only one sense. When the switch 33 is closed and the switch 13 is open, the motor is driven in the opposite sense by a reverse flow of current.

If, for example, after energization through switch 13, the switch is opened, the potential drop across diode 15 ceases and transistor 17 is limitedly conductive, the current generated by motor 12 passes through the emitter-collector network 18, 19 of transistor 17, acting as a load, dynamic braking occurs until the motor reaches standstill.

During normal operation of the motor, e.g. by closure of switch 13, the opposite transistor 37 acts as a current limiter.

Figure 2:
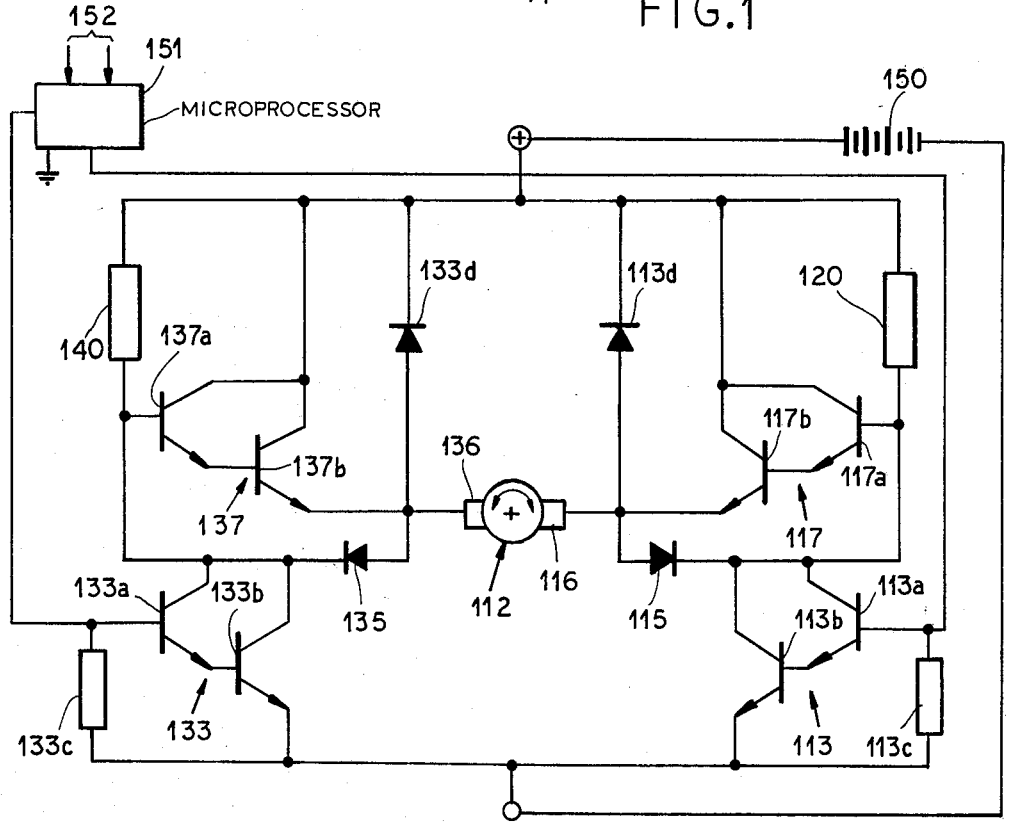
FIG. 2 shows a somewhat more complicated circuit operating in accordance with the same principles.

A more complex circuit operating under the same principles has been shown in FIG. 2 in which elements functioning similarly to those of FIG. 1 will not be described in detail but will be identified with the same numerals in a hundreds series.

In this embodiment the NPN switch transistors 117*b* and 137*b* function identically to transistors 17 and 37 and are connected in Darlington circuits 117, 137 with transistors 117*a* and 137*a*, respectively. Here the switches 13 and 33 are replaced by Darlington circuits 113 and 133 of NPN transistors 113*a*, 113*b* and 133*a*, 113*b*, respectively, controlled by a microprocessor 151 which can have control inputs 152 as represented to switch the respective Darlington circuit 113, 133 into a conductive state to drive the motor 136 in the respective direction. Dynamic braking and current limiting result in the manner previously described. The Darlington circuits 113, 133 have bias resistors 113*c*, 133*c*. Diodes 113*d*, 133*d*, as shown, are optional.

Either source 50, 150 can be a pulsed direct-current source whose pulse frequency can be controlled to regulate the speed of the motor in response, for example, to a program supplied to or established by the microprocessor 151. The embodiment of FIG. 1 is effective for low current, low material load applications while that of FIG. 2 is effective for high current, high material load applications with digital level control.

I claim:

1. A motor-control circuit consisting of:
   a direct-current motor having a pair of energization terminals;
   a direct-current source;
   a pair of direction-controlling switches each connected between a pole of said source and one terminal of said motor through a respective diode, each of said direction-controlling switches being formed as a Darlington transistor pair; and
   a respective transistor switch having an emitter-collector network connected between each terminal of said motor and the other pole of said source, and a base connected between the respective diode and a biasing resistor whereby upon operation of one of said direction-controlling switches a corresponding one of said transistor switches blocks and the other of said transistor switches is rendered conductive to drive said motor in one sense and upon inactivation of said one of said direction-controlling switches said transistor switches are effective to brake said motor, each of said transistor switches consisting of a pair of Darlington-connected transistors such that an emitter-collector network of one of the transistors of each Darlington-connected pair is connected directly to each terminal of said motor, each transistor switch, its respective resistor and diode connected to each terminal being electrically symmetrical to the transistor switch, its respective resistor and diode connected to the other terminal.

2. The circuit defined in claim 1 wherein said electronic switches are connected to a microprocessor controller.

* * * * *